United States Patent [19]

Morita

[11] Patent Number: 5,032,848
[45] Date of Patent: Jul. 16, 1991

[54] IMAGE FORMING METHOD

[75] Inventor: Naoyuki Morita, Kanagawa, Japan

[73] Assignee: Fuji Photo Film Co., Ltd., Kanagawa, Japan

[21] Appl. No.: 476,222

[22] Filed: Feb. 7, 1990

[30] Foreign Application Priority Data

Feb. 14, 1989 [JP] Japan .................................. 1-34155

[51] Int. Cl.$^5$ .............................................. G01D 9/42
[52] U.S. Cl. ...................................... 346/1.1; 346/108
[58] Field of Search .................. 346/76, 107, 108, 1.1; 358/296, 300, 302

[56] References Cited

U.S. PATENT DOCUMENTS

| 3,925,607 | 12/1975 | Hauber | 358/491 |
| 3,938,191 | 2/1976 | Jarmy | 346/108 |
| 4,430,415 | 2/1984 | Aono et al. | 430/203 |
| 4,483,914 | 11/1984 | Naito et al. | 430/203 |
| 4,500,626 | 2/1985 | Naito et al. | 430/203 |
| 4,503,137 | 3/1985 | Sawada | 430/203 |

FOREIGN PATENT DOCUMENTS

| 59-154445 | 9/1984 | Japan . |
| 59-164054 | 9/1984 | Japan . |
| 59-180548 | 10/1984 | Japan . |
| 59-218443 | 12/1984 | Japan . |
| 60-120356 | 6/1985 | Japan . |
| 61-88256 | 5/1986 | Japan . |
| 61-238056 | 10/1986 | Japan . |
| 62-129848 | 6/1987 | Japan . |
| 62-215270 | 9/1987 | Japan . |

Primary Examiner—Mark J. Reinhart
Attorney, Agent, or Firm—Sughrue, Mion, Zinn Macpeak & Seas

[57] ABSTRACT

An image forming method in which a recording head is step-driven by a stepping motor to perform vertical scanning, and a recording drum, around which a light-sensitive recording material is wound, is rotated to conduct horizontal scanning to form an image onto the light-sensitive recording material. In the image forming method, the horizontal scanning starts during residual vibration of the recording head after the stepping driving of the stepping motor stops and after a predetermined period of time from the start of the step driving. Accordingly, although horizontal-scanning lines meander due to the residual vibration, all of the horizontal-scanning lines are brought to their respective loci which are identical.

7 Claims, 4 Drawing Sheets

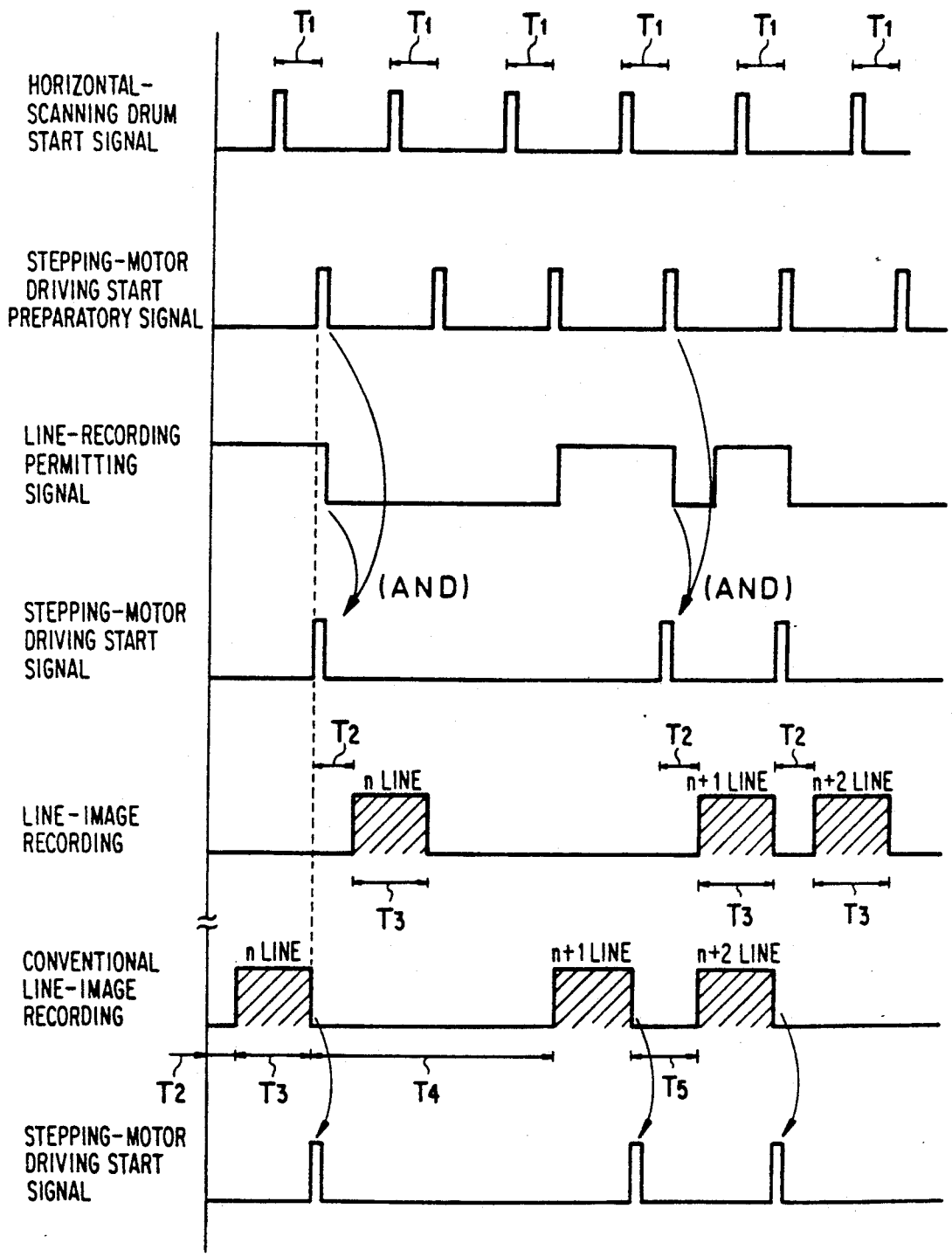

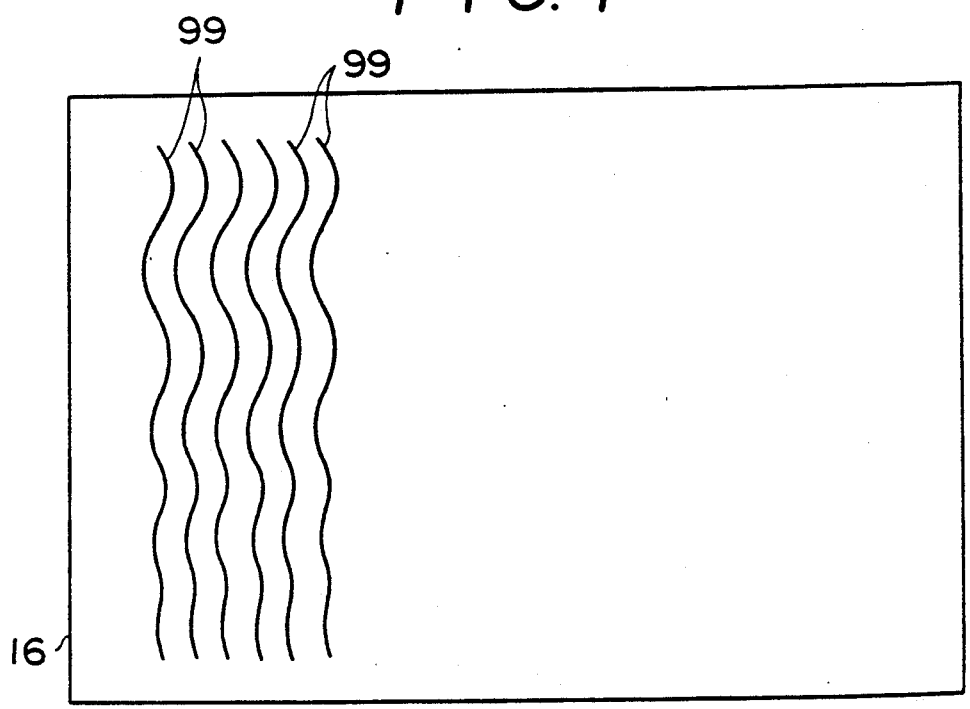
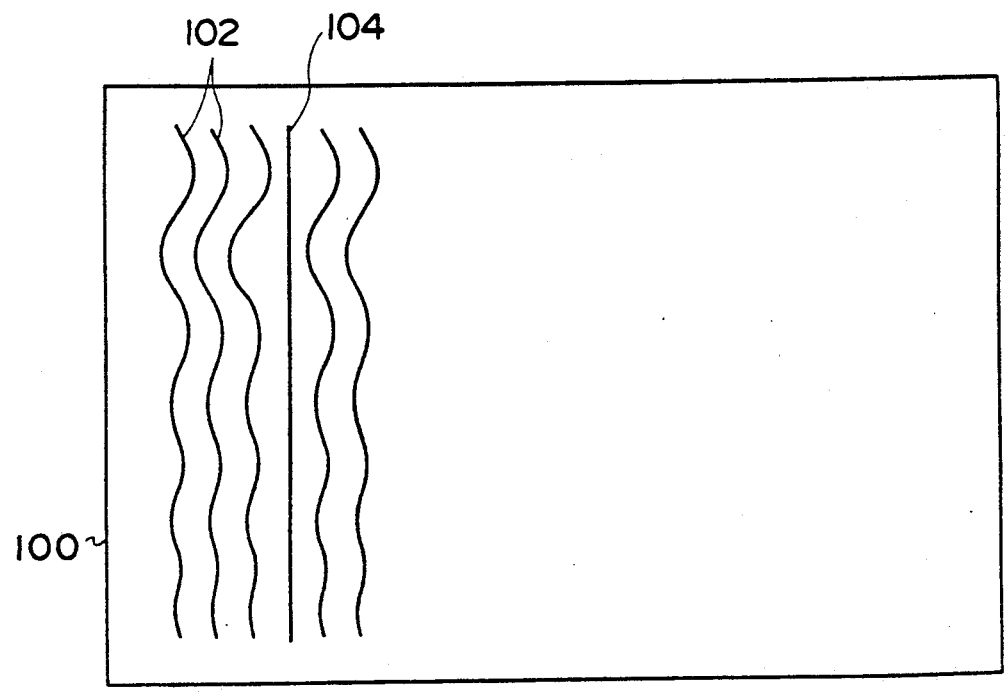

IMAGE FORMING METHOD

BACKGROUND OF THE INVENTION

1. Field of the Invention

The present invention relates to an image forming method in which a recording head and a recording material are moved relative to each other by step driving of a stepping motor to perform a vertical scanning, and a horizontal scanning is conducted at each step driving to form an image onto the recording material.

2. Description of the Prior Art

An image forming apparatus is known in which an image is exposed to light onto a heat-developable light-sensitive material (image forming sheet). The heat-developable light-sensitive material is heat-developed and, subsequently, is superimposed upon an image receiving material. The heat-developable light-sensitive material and the image receiving material are pressurized upon each other, whereby an image is transferred to the image receiving material to obtain the image.

The heat-developable light-sensitive material is wound around a recording drum which is rotated at high speed. The heat-developable light-sensitive material is exposed to light by light rays from light-emitting elements which are mounted on a recording head arranged in correspondence with the recording drum. Means for the light-exposure is scanning recording, in which horizontal scanning is performed by rotation of the recording drum, while the recording head is moved axially to the recording drum to conduct vertical scanning. That is, when the horizontal scanning is completed, the recording head is vertically scanned through one step allowing horizontal scanning to be done on a subsequent line. This is repeated whereby it is possible to record the image onto the heat-developable and light-sensitive material. The vertical scanning of the recording head is conducted by a driving force from a stepping motor. Accordingly, the stepping motor is driven through a predetermined number of pulses each time horizontal scanning, corresponding to one line, is completed. It is thereby possible to obtain horizontal scanning lines equal in pitch to each other.

In case where the stepping motor is driven at high speed and is subsequently stabilized, there is a case where no-vibration driving is impossible. Further, residual vibration occurs more or less when stopped, whereby, as shown in FIG. 5, when an image is recorded, that is, vertical scanning is performed immediately after the occurrence of the residual vibration, horizontal scanning lines 102 recorded on a light-sensitive material 100 meander. On the other hand, after stopping the stepping motor, no residual vibration occurs after a lapse of a long period of time. Thus, as shown in FIG. 5, horizontal scanning lines 104 become substantially straight lines.

Here, the timing for starting image recording is immediately after completion of reading the image data corresponding to one line. Accordingly, in case where the image data is sent at high speed, the vertical scanning lines meander. In case where the image data comes late, the image data is horizontally scanned after completion of residual vibration so that the horizontal scanning lines are brought substantially to straight lines. In this manner, a mixture of the meandering horizontal scanning lines 102 and the substantially straight vertical scanning lines 104 exerts a great influence on the image quality making it impossible to obtain high image quality.

In order to solve the above-discussed problem, the start of horizontal scanning should be delayed until residual vibration is completed. However, this considerably increases recording time so that high-speed recording cannot be done. Further, the image should be recorded at equal intervals of time after the image data corresponding to one image has been stored. In this case, however, a frame memory is indispensable or essential so that a number of component parts increases. This leads to an increase in cost.

SUMMARY OF THE INVENTION

It is therefore an object of the present invention to provide an image forming method capable of recording an image at high speed without reducing image quality, even if horizontal scanning lines meander due to residual vibration of a stepping motor.

According to the invention, there is provided an image forming method in which a recording head and a recording material are moved relative to each other to form an image onto recording material, the image forming method comprising the steps of:

step-moving the recording head due to step driving of a stepping motor to perform vertical scanning; and conducting horizontal-scanning recording in which the image is formed onto the recording material, wherein horizontal-scanning recording starts during residual vibration of the recording head after the step driving of the stepping motor stops and starts after a predetermined period of time.

According to the invention, the timing to start horizontal-scanning recording with respect to the recording material is always during the occurrence of residual vibration of the recording head due to the stepping motor and after a lapse of the predetermined period of time from the start of driving of the stepping motor. Accordingly, recorded horizontal scanning lines meander due to residual vibration which occurs after stopping the driving of the stepping motor. Since, however, loci of the meandering always becomes constant, image quality is not reduced. Further, since the image recording timing is during the occurrence of residual vibration, high speed of the image recording is not effected.

In connection with the above, the image forming method according to the present invention may be one in which, in case where a heat-developable light-sensitive material is applied as an image-forming sheet or a recording material, the heat-developable light-sensitive material exposed to light is heat-developed and, subsequently, the heat-developed, light-sensitive material and an image receiving material are superimposed upon each other and are heated to transfer the image onto the image receiving material. Further, the image forming method may be one in which the heat-developable light-sensitive material exposed to the light and the image receiving material are superimposed upon each other and are heated to perform heat development and heat transfer simultaneously.

Moreover, the image forming method according to the present invention may use a heat-developable light-sensitive material, that is, a heat-developable light-sensitive element, and an image receiving material, that is, a pigment fixture element, which are disclosed in U.S. Pat. Nos. 4,430,415, 4,483,914, 4,500,626, and 4,503,137, Japanese Patent Application Laid-Open Nos. SHO 59-154445, SHO 59-165054, SHO 59-180548, SHO 59-218443, SHO 60-120356, SHO 61-88256, SHO 61-238056, SHO 62-129848 and SHO 62-215270, and the like, for example.

BRIEF DESCRIPTION OF THE DRAWINGS

FIG. 3 is a time chart of driving control of a stepping motor;

FIG. 4 is a view for the explanation of loci of horizontal scanning lines which are recorded on a light-sensitive material according to an embodiment of the invention; and FIG. 5 is a view for the explanation of loci of horizontal scanning lines which are recorded on conventional light-sensitive material.

DETAILED DESCRIPTION

Figure 1:
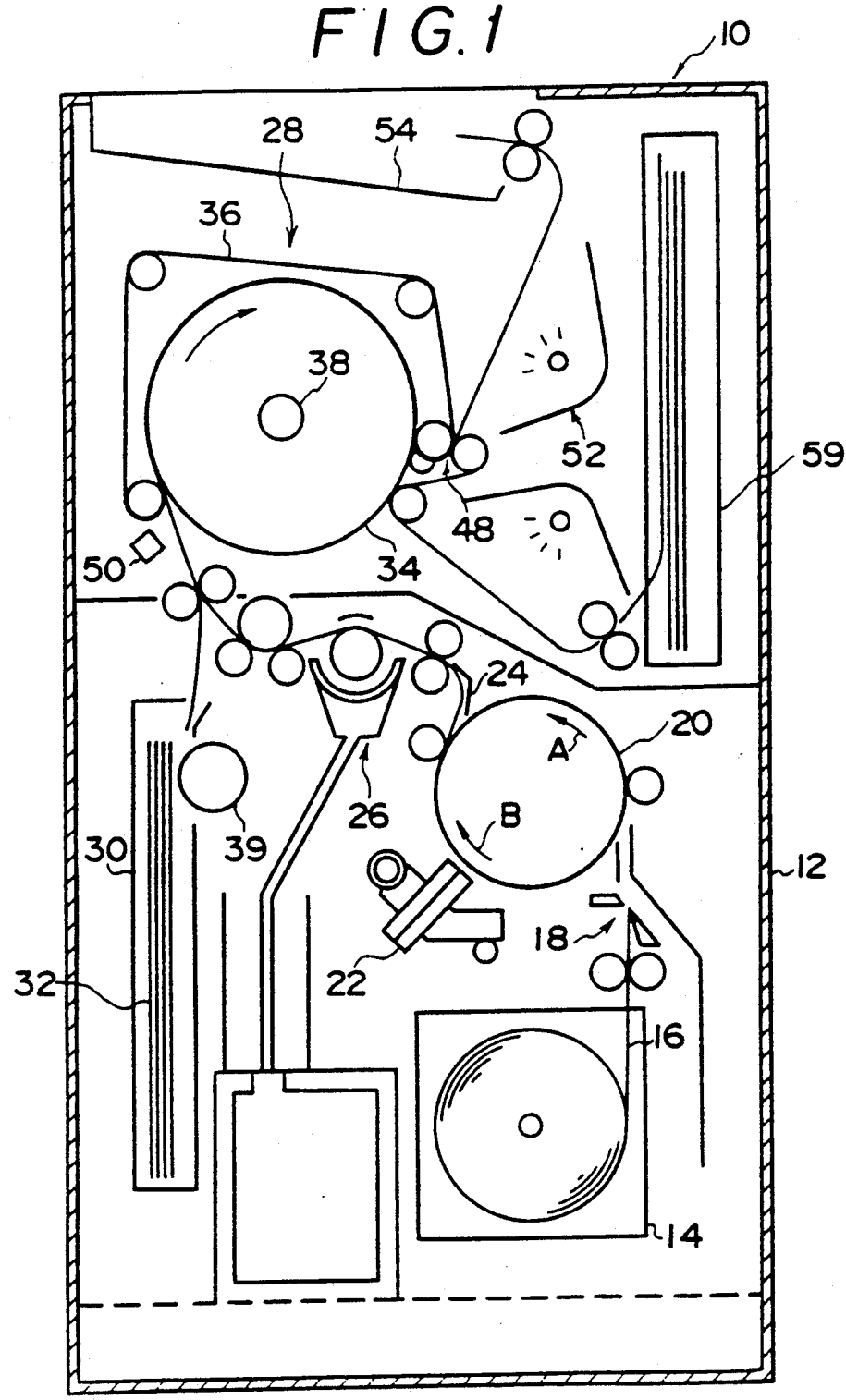
FIG. 1 is schematic cross-sectional view of an embodiment of an image forming apparatus to which the present invention is applied.

Referring to FIG. 1, there is shown an embodiment of an image forming apparatus 10 to which the present invention is applied.

The image forming apparatus 10 comprises a chassis 12 in which a magazine 14 is accommodated. Light-sensitive recording material 16, which is an image forming sheet, is accommodated in the magazine 14 in the form of a roll. The light-sensitive recording material 16 is drawn out from its outer periphery and is cut into a predetermined length by a cutter 18. Subsequently, the light-sensitive recording material 16 is wound around an outer periphery of a recording drum 20 in a direction indicated by arrow A. A recording head 22 is correspondingly arranged with the outer periphery of the recording drum 20. The recording drum 20 is rotated at high speed to expose an image onto the light-sensitive recording material 16 wound around the recording drum 20.

The light-sensitive recording material 16 after exposure is separated from the recording drum 20 by a scraper 24 through the reverse rotation of the recording drum 20 in a direction indicated by arrow B in FIG. 1. Water utilized as an image forming solvent is applied to the light-sensitive recording material 16 at a water-applying station 26. Subsequently, the light-sensitive recording material 16 is sent to a heat-development transfer station 28 whose interior is in the form of a heating section.

The heat-development transfer station 28 is composed of a heating drum 34 and an endless abutment belt 36. A halogen lamp 38 serving as a heater is arranged within the heating drum 34. The light-sensitive recording material 16 is clamped or sandwiched between the heating drum 34 and the endless abutment belt 36 and is transported or conveyed by the same so that the light-sensitive recording material 16 is heat-developed. Further, the heating drum 34 is heated to a predetermined temperature by the halogen lamp 38.

On the other hand, a plurality of image receiving materials 32 cut into equal sizes are accommodated in a tray 30 which is arranged below the heat-development transfer station 28. The image receiving materials 32 are successively taken out by a supply roller 39 which is arranged on the lateral side of the tray 30. The taken-out image receiving material 32 is sent to the heat-development transfer station 28 in such a manner that the image receiving material 32 is superimposed upon the light-sensitive recording material 16.

Separating means 48 is arranged on the lateral side of the heat-development transfer station 28, to separate the light-sensitive recording material 16 and the image receiving material 32 sent from the heat-development transfer station 28, and send them out. The separated recording material 16 is sent out to an accommodating box 59 for wasted recording materials. On the other hand, the image receiving material 32 is dried by a drier unit 52 and, subsequently, sent out onto a take-out tray 54 which is formed at a top of the chassis 12.

Figure 2:
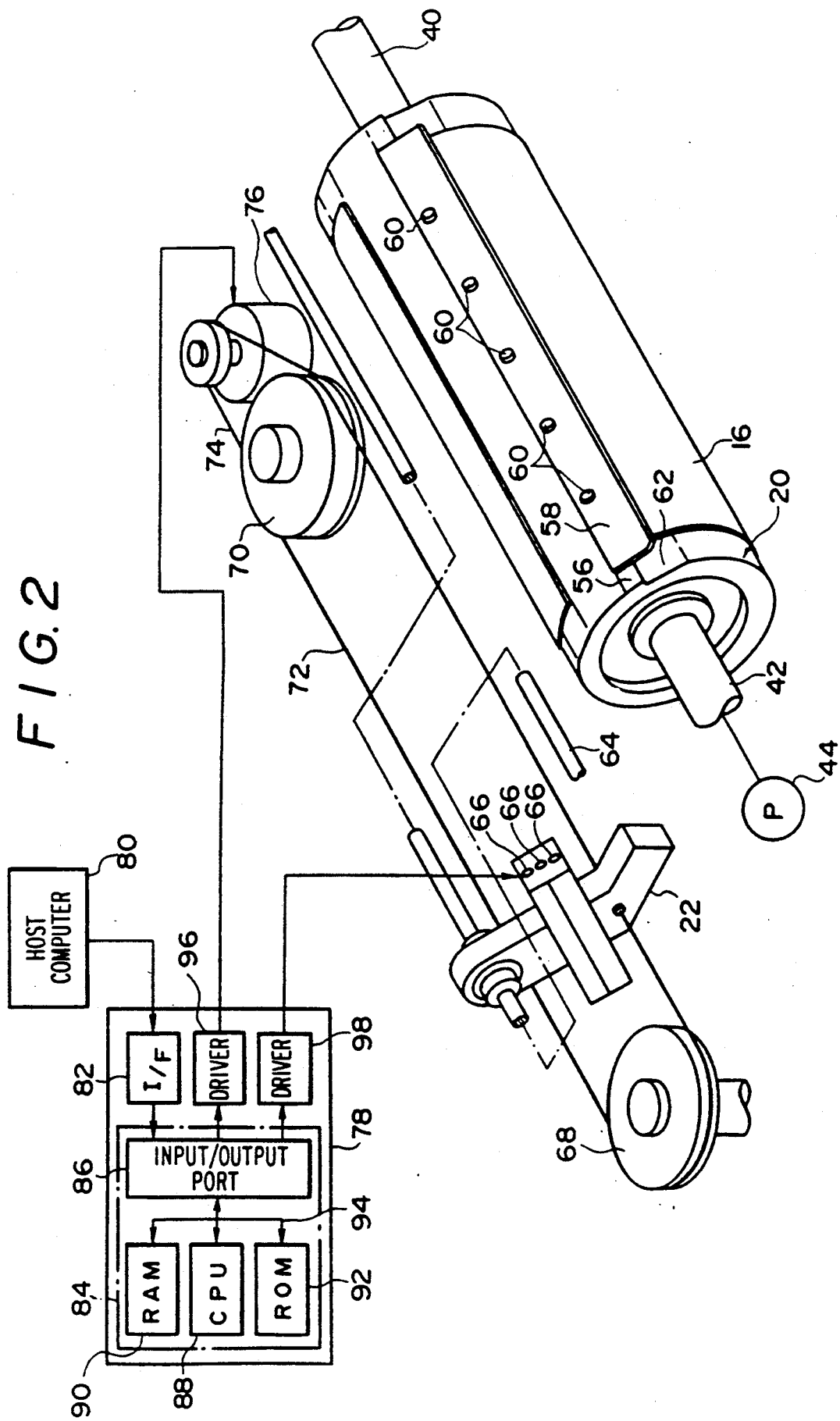
FIG. 2 is a perspective view of a recording drum and its periphery.

As shown in FIG. 2, the recording drum 20 is formed into a cylindrical shape with the hollow interior. A motor (not shown) is mounted to a shaft 40 projecting from one of both ends of the recording drum 20 to rotate the same. A shaft 42 projecting from the other end of the recording drum 20 is formed with a line passage which communicates with the interior of the recording drum 20. A vacuum pump 44 is mounted to the shaft 42 to bring the interior of the recording drum 20 to negative pressure in order to draw the light-sensitive recording material 16 through a plurality of perforations (not shown) formed in the outer periphery of the recording drum 20.

A section of the recording drum 20, along which a leading edge of the light-sensitive recording material 16 is wound, is formed into a stepped section having a planar portion. The stepped section has a high level portion 56 to which a guide plate 58 is fixedly mounted by a plurality of screws 60. Accordingly, when the light-sensitive recording material 16, cut into the predetermined lengths by the cutter 18, reaches the recording drum 20, the leading edge of the light-sensitive recording material 16 is inserted between the guide plate 58 and a low level portion 62 of the stepped section. Further, a section of the recording drum 20, which corresponds to a trailing edge of the light-sensitive recording material 16, is also formed into a planar section. Through the planar section, suction force is reinforced, and floating or rising is prevented from occurring between the recording drum 20 and the light-sensitive recording material 16.

The recording head 22 is guided by a guide bar 64 which is arranged in parallel relation to the recording drum 20, so that the recording head 22 is moved in parallel relation to an axis of the recording drum 20. An endless belt 72 wound around a pair of winding rollers 68 and 70 has a portion which is mounted to the recording head 22. One of the pair of rollers 70 is connected to a rotary shaft of a stepping motor 76 through an endless belt 74. Thus, the driving force of the stepping motor 76 moves the belt 72 so that the recording head 22 can be moved axially of the recording drum 20. By the axial movement of the recording head 22, vertical scanning is performed. The driving of the stepping motor 76 is controlled by a control section 78 stepping motor 76 is controlled by a control section 78 which will be described below.

A host computer 80 for obtaining data on an image from the outside is connected to an input/output port 86 of a microcomputer 84 through an interface (I/F) 82. In addition to the input/output port 86, the microcomputer 84 is composed of a CPU (central processing unit) 88, a RAM (random access memory) 90, a ROM (read only memory) 92 and a bus 94 such as a data bus, a control bus or the like for connecting the CPU, the RAM and the ROM to each other. The stepping motor 76 is connected to the input/output port 86 through a driver 96. Further, a plurality of light-emitting elements 66 to be described below are connected to the input/output port 86 through a driver 98. The microcomputer 84 generates image recording timing line by line on the basis of a horizontal-scanning drum start signal (refer to FIG. 3) in order to determine writing timing of the horizontal scanning.

Since the stepping motor 84 is driven on the basis of a predetermined number of pulses, pitches of the vertical scanning can easily be made uniform. When stopped after movement at each step, however, residual vibration is caused to occur at the recording head 22. In this connection, a vibration change or variation of the recording head 22 due to this residual vibration has such a characteristic that the vibration change becomes constant at the timing of each step. In the embodiment, the characteristic is utilized to start the one-line image recording in the horizontal-scanning direction during occurrence of the residual vibration immediately after the stepping motor 76 stops. That is, in the embodiment, the vertical-scanning time becomes constant as time $T_2$ as shown in FIG. 3. Regardless of the input speed of the image data corresponding to one line, the starting time of the driving of the stepping motor 76 is set before the time corresponding to the time $T_2$ from the starting time of the image recording at each time of one line.

Horizontal scanning is conducted by the light emission of the light-emitting elements 66 which are mounted to the recording head 22. Three light-emitting elements 66 are mounted to the recording head 22, and include an IR (infrared light) light-emitting element, an R (red light) light-emitting element and a Y (yellow light) light-emitting element. By the light emission of these light-emitting elements 66, the IR light-emitting element develops the light-sensitive recording material 16 to cyan; the R light-emitting element, to magenta; and the Y light-emitting element, to yellow.

The operation of the embodiment will next be described.

When the light-sensitive recording material 16, drawn out from the magazine 14, is cut by the cutter 18 and, subsequently, wound about the outer periphery of the recording drum 20, the recording drum 20 is rotated at high speed. The light-emitting elements 66 of the recording head 22 emit their respective lights, so that an image is exposed. When horizontal scanning corresponding to one line has been completed, the recording head 22 is moved in the axial direction of the recording drum 20 so that vertical scanning is conducted. This is repeated to expose the image onto the light-sensitive recording material 16.

The recording drum 20 after exposure, is rotated in the direction indicated by the arrow B in FIG. 1. As a result, the light-sensitive recording material 16 is separated by the scraper 24, and water is applied to the light-sensitive recording material 16 at the water-application station 26. Thus, the light-sensitive recording material 16 is sent to the heat-development transfer station 28.

On the other hand, the image receiving materials 32 within the tray 30 are taken out one by one by the supply roller 39, and are sent to the heat-development transfer station 28 in such a manner that the taken-out image receiving material 32 is superimposed upon the light-sensitive recording material 16. The light-sensitive recording material 16 and the image receiving material 32, which are superimposed on each other, are sent to the heat-development transfer station 28, clamped between the endless abutment belt 36 and the heating drum 34 which is heated to a predetermined temperature by the halogen lamp 38. The light-sensitive recording material 16 and the image receiving material 32 are conveyed by the heating drum 34 and the endless abutment belt 36 and are heat-developed. The heat-developed image is transferred to the image receiving material 32.

After transferring, the light-sensitive recording material 16 and the image receiving material 32 are separated from each other by the separating means 48. The light-sensitive recording material 16 is sent out to the accommodating box 59 for wasted recording materials. The image receiving material 32 is taken to the take-out tray 54 through the drier unit 52.

Here, in the embodiment, the start timing of the horizontal scanning with respect to each line is determined to a constant period of time during occurrence of the residual vibration immediately after completion of the vertical scanning and from the start of the vertical scanning, that is, from the start of the driving of the stepping motor 76. This is because the driving of the stepping motor 76 is conducted under control of the control section 78. Hereunder, the driving control of the stepping motor 76 will be described with reference to the time chart of FIG. 3.

When reading the image data at the n line, a line-recording permitting signal is brought to a high level. AND is taken between the line-recording permitting signal and a start preparatory signal of the driving of the stepping motor 76, which is delayed by time $T_1$ from a horizontal-scanning drum start signal, thereby obtaining a start signal for the driving of the stepping motor 76. The stepping motor 76 performs step driving at this time. Further, after time $T_2$, line-image recording is started. This is repeated. At this time, at time $T_2$ which is the driving time of the stepping motor 76 and which is non-recording time (blanking time) of the horizontal scanning, the stepping motor is not completely stabilized, but is under a meandering condition, as described previously.

Through the driving of the stepping motor 76, the belt 72 is moved and, accompanied with this, the recording head 22 is moved in the vertical-scanning direction.

In this manner, in the embodiment, horizontal scanning starts during the occurrence of the residual vibration immediately after the driving of the stepping motor 76 stops and after a lapse of a predetermined period of time from the start of driving of the stepping motor. Accordingly, as shown in FIG. 4, although meandering of the horizontal scanning lines 99 occurs due to the residual vibration of the stepping motor 76, the meandering loci are made equal to each other in all of the lines. Thus, the image quality is not reduced due to non-uniformity of the vertical scanning pitches so that the image can be stably recorded. The conventional line-recording method will next be described corresponding to the image recording of the embodiment. The conventional method is such that the stepping motor 76 is driven immediately after previous line recording, and, when reading of the subsequent image data is completed, the subsequent horizontal-scanning recording is performed regardless of the stabilizing condition of the stepping motor. That is, as indicated as the conventional line-image recording on the below in FIG. 3, the stepping motor begins to be driven immediately after completion of horizontal-scanning recording at the n line, so that step driving is conducted for a predetermined distance. Subsequently, when reading the image data at the n line so that the line-recording permitting signal is issued, the image recording at the n+1 line (after time $T_4$ after the start of driving of the stepping motor), regardless of the stabilizing condition of the step driving at the vertical scanning. Immediately after completion of the recording at the n+1 line, vertical scanning starts for recording of the subsequent line. When reading the image data at n+2 line, image recording on the n+2 line is conducted (after time $T_5$ after the start of driving of the stepping motor), similarly to the n+1 line. In this manner, the stabilizing condition of the stepping motor till the start of the line recording differs largely, and an amount of meandering also varies. Thus, the stabilizing condition is brought to one illustrated in FIG. 5, for example. In this connection, in the embodiment, since the horizontal-scanning recording is performed during the occurrence of the residual vibration immediately after the driving of the stepping motor 76 stops, the high speediness is not effected. Specifically, the case, where recording corresponding to one image is formed by 1280 horizontal-scanning lines will be considered. In this case, if horizontal-scanning recording starts after $T_2=11$ msec from the start of the driving of the stepping motor 76, and if the horizontal-scanning recording at $T_3$ msec is performed, the recording time of one image becomes 33 msec$\times$1280=42 sec. On the other hand, it takes approximately 40 msec until the stepping motor 76 completely stops after driving at one step. Accordingly, in case where the horizontal-scanning recording is conducted after the complete stop of the stepping motor 76, the recording time of one image becomes 62 msec$\times$1280=79 sec. Thus, the shortening of the recording time by approximately 37 sec can be realized as compared with the case where the horizontal-scanning recording is effected after a complete stop of the stepping motor 76. Moreover, it is unnecessary to store image data corresponding to one image into a frame memory or the like, but the image data should be read at each time of one line. Thus, the image quality can be improved, while the number of control component parts and the cost are maintained as they are.

In connection with the above, although, in this embodiment, horizontal scanning starts immediately after the driving of the stepping motor 76 stops, horizontal scanning may start after a predetermined period of time after the stopping of the driving of the stepping motor 76. That is, if the predetermined period of time is lengthened, the image quality is improved, while, if the predetermined period of time is shortened, the high speediness is improved. Thus, time should be set which is most adequate for both.

As described above, the driving control method of the stepping motor 76 according to the invention has such superior advantages that, even if the horizontal scanning lines meander due to the residual vibration of the stepping motor 76, the image quality is not reduced so that it is possible to record the image at high speed.

What is claimed is:

1. An image forming method in which a recording head and a recording drum having its outer peripheral surface around which a light-sensitive recording material is wound, are moved relative to each other to form an image onto said light-sensitive recording material, said image forming method comprising the steps of:
   step-moving said recording head due to step driving of a stepping motor to perform vertical scanning; and
   rotating said recording drum to conduct horizontal-scanning recording in which an image is formed onto said recording material, wherein said horizontal-scanning recording starts during residual vibration of said recording head after the step driving of said stepping motor stops and after a predetermined period of time from start of said step driving.

2. An image forming method according to claim 1, wherein the step driving of said stepping motor starts after completion of reading of image data corresponding to one line.

3. An image forming method according to claim 1, wherein start time of said step driving is obtained by taking AND between a line-recording permitting signal and a step-driving start preparatory signal of said stepping motor which is delayed a predetermined period of time from a horizontal-scanning start signal.

4. An image forming method in which a recording head and a recording material are moved relative to each other to form an image onto said recording material, said image forming method comprising the steps of:
   step-moving said recording head due to step driving of a stepping motor to perform vertical scanning; and
   conducting horizontal-scanning recording in which an image is formed onto said recording material, wherein said horizontal-scanning recording starts during residual vibration of said recording head after stop the step driving of said stepping motor stops and after a predetermined period of time from the start of said step driving.

5. An image forming method according to claim 1, wherein said recording material is wound around a recording drum, and said horizontal-scanning recording is performed due to rotation of said recording drum about an axis thereof.

6. An image forming method according to claim 2, wherein the step driving of said stepping motor starts after the completion of reading image data corresponding to one line.

7. An image forming method according to claim 3, wherein a start time of said step driving is obtained by taking AND between a line-recording permitting signal and a step-driving start preparatory signal of said stepping motor which is delayed a predetermined period of time from a horizontal-scanning start signal.

* * * * *